Patented Jan. 24, 1939

2,145,011

UNITED STATES PATENT OFFICE 2,145,011

PROCESS FOR MATTING TEXTILES

Albert Landolt, Riehen, and Gustave Widmer and Hans Benz, Basel, Switzerland, assignors to firm Society of Chemical Industry in Basle, Basel, Switzerland No Drawing. Application February 19, 1936, Serial No. 64,796. In Switzerland February 23, 1935

15 Claims. (Cl. 8—135)

This invention relates to a process for producing matt effects by treatment of textiles in a bath with a condensation product insoluble in water, obtainable from a compound of the urea-group and formaldehyde or an agent yielding this. The matting bath suitable for the invention preferably contains a previously formed finished condensation product of the kind in question. From the fine suspension thus produced the condensation product is taken up by the fibre and united therewith in the form of a water-soluble pigment producing the matt effect and proving fast to washing.

The invention may be applied, for example, by dissolving a water-insoluble condensation product from formaldehyde and a compound of the urea-group in a suitable dispersing agent, advantageously hydrochloric acid or formic acid, and then diluting the liquid thus obtained with water. The textile material is then treated in the liquor thus obtained at a suitable temperature with or without an addition favouring the exhaustion of the liquor. During this treatment reprecipitation of the condensation product in finely subdivided form occurs and this product is deposited in the manner of a pigment in the fibre. The lustre of the fibre is thus annulled. The textile material, finished in known manner, then exhibits a strong matt effect which has an excellent fastness to washing.

Moreover, pigment-like condensation products may be applied by this invention, whereby colored matt effects are obtained, when suitable dyestuffs are selected, condensation, dyeing and matting may proceed simultaneously or successively.

Compounds of the urea-group suitable for the invention include products of the general formula

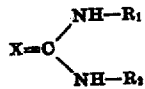

wherein $R_1$ stands for H, alkyl, aralkyl, aryl (such as benzyl, chlorobenzyl, phenyl, tolyl, chlorophenyl radicals etc.) cyanogen or —CO—$NH_2$ etc., $R_2$ stands for H, alkyl, aralkyl, aryl (such as benzyl, chlorobenzyl, phenyl, tolyl, chlorophenyl etc.) or cyanogen etc., and X stands for O, S, NH, such as urea itself, thiourea, dicyandiamide, of the formula

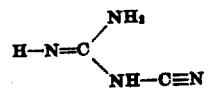

biuret, $NH_2$—CO—NH—CO—$NH_2$, guanylurea of the formula

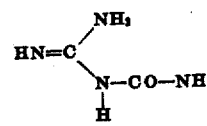

guanidine of the formula

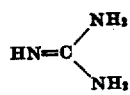

methyl-urea, benzylurea, chlorobenzylurea, phenylurea, chlorophenylurea, tolylurea or the like; also mixtures of these products with each other, particularly those of urea and thiourea. Instead of formaldehyde, a polymeride thereof or an agent yielding formaldehyde may be used. The agent used for dissolving or dispersing the condensation product must be miscible with water, for instance it may be an inorganic or an organic acid.

The following examples illustrate the invention, the parts being by weight unless otherwise stated, and the parts by weight and parts by volume being related to each other as is the kilo to the litre:—

Example 1

A urea-formaldehyde condensation product is made by dissolving 1 mol. urea in 2 mols. formaldehyde in aqueous solution, neutralizing the solution and heating it in a closed vessel for 6–8 hours at about 100° C. The feebly viscous water-soluble urea-formaldehyde condensation product thus obtained is dried at a low temperature in a good vacuum (product A).

Example 2

12.5 parts by weight of product A (compare Example 1) are mixed with 2.5 parts of thiourea and the mixture is dissolved in 15 parts of water. This solution is heated on an aluminium sheet for 4 hours at 130° C. and the foamy water-insoluble product is ground (product B).

12.5 kilos of a colloidal aqueous solution of 4 per cent. strength of product B are added to a bath of 300 litres of water at 35° C., 3 kilos of aluminium sulfate are then added and 10 kilos of artificial silk are entered. After 30 minutes handling, the silk has obtained a matt appearance, thoroughly fast to washing.

Example 3

2 gram-mol. dicyandiamide are dissolved by long heating on the boiling water-bath in 4 gram-mol. aqueous formaldehyde. The solution is then filtered through a little animal charcoal and the clear liquid is treated at 130° C. on an aluminium sheet for 4 hours; it first dries and then becomes hardened by the heat. The foamy mass, insoluble in water, is pulverized (product C).

To 600 litres of water at 35° C. are added 10 litres of a solution of 20 per cent. strength of product C in formic acid. 1.6 kilos of Glauber's salt are then added and 20 kilos of viscose knitted goods are treated in the liquor for 30 minutes on a rotating reel. After rinsing and drying the goods exhibit good matting effect, which is fast to washing.

Example 4

12.5 kilos of product A are dissolved together with 2.5 kilos of thiourea in 60 litres of water at 60° C. There are then added 4 litres of a solution of hydrochloric acid of about 4 per cent. strength, whereupon in the course of a few minutes a curdy precipitate separates. It is heated for 1 hour at 70° C. and allowed to cool overnight. The now brittle precipitate is washed free from chlorine and dried for 7 hours at 60° C. (product D).

2.5 litres of a solution of 40 per cent. strength of product D in formic acid are poured into 300 litres of water at 35° C. There are then entered 10 kilos of Bemberg artificial silk and after 10 minutes 2 kilos of Glauber's salt are added. After half-an-hour's adsorption the artificial silk is removed from the bath, rinsed and dried. In this manner there is obtained a strong matt effect fast to washing.

A somewhat stronger matt effect, which is also fast to washing, is obtained by after-heating the product D for 1 hour at 130° C. before it is dissolved in formic acid.

Example 5

A solution of 60 parts of urea and 150 parts by volume of formaldehyde solution of 40 per cent. strength by volume is diluted with 100 parts by volume of water. In this solution 0.9 part of ammonium chloride is dissolved. This liquid is allowed to stand overnight, filtered and the separated precipitate is dried and dissolved in formic acid. So much of the solution is added to the matting bath as is necessary to introduce 5–10 per cent. of the dry urea-formaldehyde condensation product, calculated on the fibre. The textile material is now entered into the lukewarm vat and handled therein until the desired effect is obtained. After rinsing and finishing a matt effect fast to washing is obtained.

Example 6

12.5 parts of product A and 2.5 parts of thiourea are dissolved in 60 parts of water of 60° C. 1 part of Orange II (Schultz, 7th edition, No. 189) are then added and formation of the urea-thiourea-formaldehyde condensation product produced by adding 2 parts of hydrochloric acid of 10 per cent. strength. Already, after about 10 minutes at 80° C. the mass has largely gelatinized. After standing overnight the sandy precipitate, which has been formed, is filtered from the slightly turbid liquor, washed, dried in the air and finally after-heated for 1 hour at 130° C. (product E).

4 litres of a solution of 25 per cent. strength of product E in formic acid are added to 300 litres of water at 35° C. There are then entered 10 kilos of viscose artificial silk and, after handling for a quarter of an hour 1 kilo of Glauber's salt is added, and after a further handling for a quarter of an hour the silk is rinsed and dried. There is thus obtained an orange matt artificial silk.

Example 7

4 parts of dimethylol-urea, 1 part of calcined sodium sulfate and 1 part of thiourea are dissolved hot in 24 parts by volume of water and to this hot solution 0.12 part of sulfuric acid is added. After a minute, a white precipitate begins to separate, which is then filtered after cooling, washed free from acid and dried (product F).

¼ litre of a solution of 40 per cent. strength of product F in formic acid is added to 30 litres of water at 35° C. Into this liquor 1 kilo of dyed artificial silk stockings are introduced and handled for 30 minutes. After the usual finishing, the stockings present a matt appearance fast to washing.

Example 8

60 parts of urea are dissolved in 75 parts by volume of aqueous formaldehyde of 40 per cent. strength by volume and the solution is mixed with 2.4 parts by volume of concentrated hydrochloric acid. The precipitate is filtered, washed and dried (product G).

This product is then dissolved in its own weight of heated hydrochloric acid to produce a clear solution.

To make the matting liquor 300 litres of cold water and 2 litres of the hydrochloric acid solution of product G referred to above are mixed. 10 kilos of viscose artificial silk are entered and handled for ¾ hour. Thorough washing and drying follow. There is obtained a matt effect fast to washing.

Example 9

To 12.5 kilos of an aqueous colloid emulsion of 4 per cent. strength of product F (Example 7) are added 300 litres of water at 35° C., followed by the addition of 3 kilos of aluminium sulfate. 10 kilos of artificial silk are entered into this bath and after 30 minutes handling there is obtained a good matt effect, fast to washing.

Example 10

400 grams of the product D obtained as described in Example 4 and after-heated at 130° C. for 1 hour, are dissolved in 1 litre of formic acid of 85 percent. strength and the solution is poured into 80 litres of water at ordinary temperature. 4 kilos of mercerized cotton yarn are entered into this liquor. After the yarn has been handled for 10 minutes 80 grams of crystallized sodium sulfate are added to the bath, handling is continued for a further 10 minutes and the bath is heated to 35° C. After 15 minutes the cotton yarn is removed, rinsed in water and dried. The yarn shows no lustre and the matt effect remains after washing. In like manner, silk, wool and acetate artificial silk can be matted.

Example 11

The water-soluble product A (compare Example 1) is hardened for 4 hours at 130° C. and thereby made insoluble in water (product H).

1 part of this product H is dissolved in 4 parts by volume of hot formic acid of 85 per cent. strength and the solution is poured into 300 parts of water at 35-40° C. A white colloidal solution is produced. 10 parts of viscose artificial silk (for example in the form of hanks) are handled in this liquor and, after some minutes, 3 per cent. of Glauber's salt, calculated on the artificial silk material, are added, whereby the matting substance is adsorbed by the artificial silk within half-an-hour. A good matt effect is obtained which is fast to washing.

Example 12

Dimethylolurea is hardened for 4 hours at 130° C. and thus made insoluble in water (product I).

1 part of product I is dissolved in 6 parts by volume of concentrated formic acid and the solution obtained is poured into 300 parts of water at 40° C. whereby a white colloidal solution is produced. 10 parts of viscose artificial silk hanks are handled in this solution with subsequent addition of 3-5 per cent. of Glauber's salt. A good matt effect fast to washing is obtained.

What we claim is:—

1. A process of matting, wherein a water-insoluble condensation product from formaldehyde and a compound of the urea group of the general formula

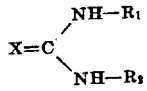

wherein $R_1$ stands for a member of the group consisting of hydrogen, alkyl, aralkyl, aryl, cyanogen and —CO—NH$_2$, $R_2$ stands for a member of the group consisting of hydrogen, alkyl, aralkyl, aryl, cyanogen and —CO—NH$_2$, and X stands for a member of the group consisting of O, S, NH, is adsorbed by textile fibers from an aqueous medium in which the condensation product is caused to separate in colloidal state, this separation being carried out by diluting a solution of the performed condensation product in and acid selected from the group consisting of hydrochloric, lactic and formic acid.

2. A process of matting, wherein a water-insoluble condensation product from formaldehyde and a compound of the urea group of the general formula

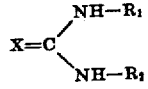

wherein $R_1$ stands for a member of the group consisting of hydrogen, alkyl, aralkyl, aryl, cyanogen and —CO—NH$_2$, $R_2$ stands for a member of the group consisting of hydrogen, alkyl, aralkyl, aryl, cyanogen and —CO—NH$_2$, and X stands for a member of the group consisting of O, S, NH, is adsorbed by textile fibers consisting of cellulose from an aqueous medium in which the condensation product is caused to separate in colloidal state, this separation being carried out by diluting a solution of the performed condensation product in an acid selected from the group consisting of hydrochloric, lactic and formic acid.

3. A process of matting, wherein a water-insoluble condensation product from formaldehyde and a compound of the urea group of the general formula

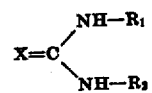

wherein $R_1$ stands for a member of the group consisting of hydrogen, alkyl, aralkyl, aryl, cyanogen and —CO—NH$_2$, $R_2$ stands for a member of the group consisting of hydrogen, alkyl, aralkyl, aryl, cyanogen and —CO—NH$_2$, and X stands for a member of the group consisting of O, S, NH, is adsorbed by textile fibers consisting of regenerated cellulose from an aqueous medium in which the condensation product is caused to separate in colloidal state, this separation being carried on by diluting a solution of the performed condensation product in an acid selected from the group consisting of hydrochloric, lactic and formic acid.

4. A process of matting, wherein a water-insoluble condensation product from formaldehyde and a compound of the urea group of the general formula

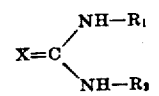

wherein $R_1$ stands for a member of the group consisting of hydrogen, alkyl, aralkyl, aryl, cyanogen and —CO—NH$_2$, $R_2$ stands for a member of the group consisting of hydrogen, alkyl, aralkyl, aryl, cyanogen and —CO—NH$_2$, and X stands for a member of the group consisting of O, S, NH, is adsorbed by textile fibers from an aqueous medium in which the condensation product is caused to separate in colloidal state, this separation being carried out by diluting a solution of the performed condensation product in formic acid.

5. A process of matting, wherein a water-insoluble condensation product from formaldehyde and a compound of the urea group of the general formula

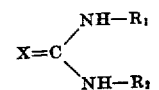

wherein $R_1$ stands for a member of the group consisting of hydrogen, alkyl, aralkyl, aryl, cyanogen and —CO—NH$_2$, $R_2$ stands for a member of the group consisting of hydrogen, alkyl, aralkyl, aryl, cyanogen and —CO—NH$_2$, and X stands for a member of the group consisting of O, S, NH, is adsorbed by textile fibers consisting of cellulose from an aqueous medium in which the condensation product is caused to separate in colloidal state, this separation being carried out by diluting a solution of the performed condensation product in formic acid.

6. A process of matting, wherein a water-insoluble condensation product from formaldehyde and a compound of the urea group of the general formula

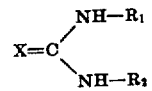

wherein $R_1$ stands for a member of the group consisting of hydrogen, alkyl, aralkyl, aryl, cyanogen and —CO—NH$_2$, $R_2$ stands for a member of the group consisting of hydrogen, alkyl, aralkyl, aryl, cyanogen and —CO—NH$_2$, and X stands for a member of the group consisting of O, S, NH, is adsorbed by textile fibers consisting of regenerated cellulose from an aqueous medium in which the condensation product is caused to separate in colloidal state, this separation being carried out by diluting a solution of the performed condensation product in formic acid.

7. A process of matting, wherein a water-insoluble condensation product from formaldehyde and urea is adsorbed by textile fibers from an aqueous medium in which the condensation product is caused to separate in colloidal state, this separation being carried out by diluting a solution of the performed condensation product in formic acid.

8. A process of matting, wherein a water-insoluble condensation product from formaldehyde and urea is adsorbed by textile fibers consisting of cellulose from an aqueous medium in which the condensation product is caused to separate in colloidal state, this separation being carried out by diluting a solution of the performed condensation product in formic acid.

9. A process of matting, wherein a water-insoluble condensation product from formaldehyde and urea is adsorbed by textile fibers consisting of regenerated cellulose from an aqueous medium in which the condensation product is caused to separate in colloidal state, this separation being carried out by diluting a solution of the performed condensation product in formic acid.

10. A process of matting, wherein a water-insoluble condensation product from formaldehyde and thiourea is adsorbed by textile fibers from an aqueous medium in which the condensation product is caused to separate in colloidal state, this separation being carried out by diluting a solution of the performed condensation product in formic acid.

11. A process of matting, wherein a water-insoluble condensation product from formaldehyde and thiourea is adsorbed by textile fibers consisting of cellulose from an aqueous medium in which the condensation product is caused to separate in colloidal state, this separation being carried out by diluting a solution of the performed condensation product in formic acid.

12. A process of matting, wherein a water-insoluble condensation product from formaldehyde and thiourea is adsorbed by textile fibers consisting of regenerated cellulose from an aqueous medium in which the condensation product is caused to separate in colloidal state, this separation being carried out by diluting a solution of the performed condensation product in formic acid.

13. A process of matting, wherein a water-insoluble condensation product from formaldehyde and a mixture of urea and thiourea is adsorbed by textile fibers from an aqueous medium in which the condensation product is caused to separate in colloidal state, this separation being carried out by diluting a solution of the performed condensation product in formic acid.

14. A process of matting, wherein a water-insoluble condensation product from formaldehyde and a mixture of urea and thiourea is adsorbed by textile fibers consisting of cellulose from an aqueous medium in which the condensation product is caused to separate in colloidal state, this separation being carried out by diluting a solution of the performed condensation product in formic acid.

15. A process of matting, wherein a water-insoluble condensation product from formaldehyde and a mixture of urea and thiourea is adsorbed by textile fibers consisting of regenerated cellulose from an aqueous medium in which the condensation product is caused to separate in colloidal state, this separation being carried out by diluting a solution of the performed condensation product in formic acid.

ALBERT LANDOLT.
GUSTAVE WIDMER.
HANS BENZ.

---

CERTIFICATE OF CORRECTION.

Patent No. 2,145,011.   January 24, 1939.

ALBERT LANDOLT, ET AL.

It is hereby certified that error appears in the printed specification of the above numbered patent requiring correction as follows: Page 3, first column, lines 49 and 70; same page, second column, lines 18, 39, 59; page 4, first column, lines 5, 13, 21, 29-30, and 37; and second column, lines 3, 12, 20, 29, and 38, claims 1 to 15 inclusive, for "performed" read preformed; page 3, first column, line 50, claim 1, for the word "and" before "acid" read an; and that the said Letters Patent should be read with this correction therein that the same may conform to the record of the case in the Patent Office.

Signed and sealed this 15th day of August, A. D. 1939.

Leslie Frazer (Seal)   Acting Commissioner of Patents.

of regenerated cellulose from an aqueous medium in which the condensation product is caused to separate in colloidal state, this separation being carried out by diluting a solution of the performed condensation product in formic acid.

7. A process of matting, wherein a water-insoluble condensation product from formaldehyde and urea is adsorbed by textile fibers from an aqueous medium in which the condensation product is caused to separate in colloidal state, this separation being carried out by diluting a solution of the performed condensation product in formic acid.

8. A process of matting, wherein a water-insoluble condensation product from formaldehyde and urea is adsorbed by textile fibers consisting of cellulose from an aqueous medium in which the condensation product is caused to separate in colloidal state, this separation being carried out by diluting a solution of the performed condensation product in formic acid.

9. A process of matting, wherein a water-insoluble condensation product from formaldehyde and urea is adsorbed by textile fibers consisting of regenerated cellulose from an aqueous medium in which the condensation product is caused to separate in colloidal state, this separation being carried out by diluting a solution of the performed condensation product in formic acid.

10. A process of matting, wherein a water-insoluble condensation product from formaldehyde and thiourea is adsorbed by textile fibers from an aqueous medium in which the condensation product is caused to separate in colloidal state, this separation being carried out by diluting a solution of the performed condensation product in formic acid.

11. A process of matting, wherein a water-insoluble condensation product from formaldehyde and thiourea is adsorbed by textile fibers consisting of cellulose from an aqueous medium in which the condensation product is caused to separate in colloidal state, this separation being carried out by diluting a solution of the performed condensation product in formic acid.

12. A process of matting, wherein a water-insoluble condensation product from formaldehyde and thiourea is adsorbed by textile fibers consisting of regenerated cellulose from an aqueous medium in which the condensation product is caused to separate in colloidal state, this separation being carried out by diluting a solution of the performed condensation product in formic acid.

13. A process of matting, wherein a water-insoluble condensation product from formaldehyde and a mixture of urea and thiourea is adsorbed by textile fibers from an aqueous medium in which the condensation product is caused to separate in colloidal state, this separation being carried out by diluting a solution of the performed condensation product in formic acid.

14. A process of matting, wherein a water-insoluble condensation product from formaldehyde and a mixture of urea and thiourea is adsorbed by textile fibers consisting of cellulose from an aqueous medium in which the condensation product is caused to separate in colloidal state, this separation being carried out by diluting a solution of the performed condensation product in formic acid.

15. A process of matting, wherein a water-insoluble condensation product from formaldehyde and a mixture of urea and thiourea is adsorbed by textile fibers consisting of regenerated cellulose from an aqueous medium in which the condensation product is caused to separate in colloidal state, this separation being carried out by diluting a solution of the performed condensation product in formic acid.

ALBERT LANDOLT.
GUSTAVE WIDMER.
HANS BENZ.

---

CERTIFICATE OF CORRECTION.

Patent No. 2,145,011. January 24, 1939.

ALBERT LANDOLT, ET AL.

It is hereby certified that error appears in the printed specification of the above numbered patent requiring correction as follows: Page 3, first column, lines 49 and 70; same page, second column, lines 18, 39, 59; page 4, first column, lines 5, 13, 21, 29-30, and 37; and second column, lines 3, 12, 20, 29, and 38, claims 1 to 15 inclusive, for "performed" read preformed; page 3, first column, line 50, claim 1, for the word "and" before "acid" read an; and that the said Letters Patent should be read with this correction therein that the same may conform to the record of the case in the Patent Office.

Signed and sealed this 15th day of August, A. D. 1939.

Leslie Frazer (Seal) Acting Commissioner of Patents.